United States Patent [19]

Gunnerson et al.

[11] Patent Number: 5,159,972
[45] Date of Patent: Nov. 3, 1992

[54] CONTROLLABLE HEAT PIPES FOR THERMAL ENERGY TRANSFER

[75] Inventors: Fred S. Gunnerson, Oviedo; F. Dave Sanderlin, Lakeland; Joy R. Iurato; Antonio A. Padilla, both of Tampa, all of Fla.

[73] Assignee: Florida Power Corporation, St. Petersburg, Fla.

[21] Appl. No.: 672,926

[22] Filed: Mar. 21, 1991

[51] Int. Cl.⁵ .................. F28D 15/02; F28F 27/00
[52] U.S. Cl. .......................... 165/32; 165/96; 165/104.21; 62/90
[58] Field of Search .............. 165/32, 96, 104.21; 126/433; 62/90

[56] References Cited

U.S. PATENT DOCUMENTS

| | | | |
|---|---|---|---|
| 1,975,868 | 10/1934 | Schlumbohm | 62/91.5 |
| 3,112,877 | 12/1963 | Snelling | 236/1 |
| 3,213,934 | 10/1965 | Jentent | 165/32 |
| 3,548,930 | 12/1970 | Byrd . | |
| 3,603,379 | 9/1971 | Leonard, Jr. | 165/2 |
| 3,756,903 | 9/1973 | Jones . | |
| 3,762,469 | 10/1973 | Babb . | |
| 3,964,902 | 6/1976 | Fletcher et al. . | |
| 4,154,175 | 5/1979 | Gritsuk | 165/104.21 |
| 4,162,701 | 7/1979 | Ollendorf | 165/32 |
| 4,182,409 | 1/1980 | Robinson, Jr. | 165/104 |
| 4,254,820 | 3/1981 | Asselman et al. | 165/39 |
| 4,308,912 | 1/1982 | Knecht | 126/433 |
| 4,444,249 | 4/1984 | Cady | 126/433 |
| 4,687,048 | 8/1987 | Edelstein et al. | 165/1 |
| 4,979,472 | 12/1990 | Pohlmann | 165/104.21 |

FOREIGN PATENT DOCUMENTS

| | | | |
|---|---|---|---|
| 44441 | 4/1977 | Japan | 165/104.21 |
| 20995 | 2/1981 | Japan | 165/96 |

*Primary Examiner*—Albert W. Davis, Jr.
*Attorney, Agent, or Firm*—Herbert W. Larson

[57] ABSTRACT

A system of sealed heat pipes enclosing a working fluid. In the heating mode, the working fluid is evaporated and the latent heat of vaporization is transported through the heat pipes to the condenser region. The condensate returns to the evaporator region through a liquid bypass line containing a liquid storage reservoir and a heating control valve. In the cooling mode, a cooling control valve is opened to increase the specific volume of the heat pipe system. During operation, heat is absorbed from the evaporator region and transferred by the working fluid vapor through the heat pipe system to the cold media. Condensate returns to the external evaporator by a liquid return line containing a liquid storage reservoir and a cooling control valve. Electric resistance heating can be incorporated to heat the reservoir. Vapor from the reservoir passes into the heat pipe system through a check valve vapor line. Shutdown and system control are regulated by the reservoir cutoff valve and electric heating.

5 Claims, 3 Drawing Sheets

CONTROLLABLE HEAT PIPES FOR THERMAL ENERGY TRANSFER

BACKGROUND OF THE INVENTION

1. Field of The Invention.

This invention relates to heat pipes operating as a closed evaporating-condensing cycle for transporting thermal energy More particularly, this invention refers to a modulated heat pipe system which is used to improve the dehumidification of an air conditioning system and/or to provide an efficient heat exchanger which can operate in varying temperature ranges.

2. Description of The Prior Art

Heat pipes can be defined as devices employing closed evaporating-condensing cycles for transporting heat from a locale of heat generation to a locale of heat reception. They may or may not use a capillary structure or wick to facilitate return of the condensate and may be in any shape or geometry. Heat pipes have been recognized for several years as very effective heat transport devices. See U.S. Pat. Nos. 3,756,903 and 4,182,409. They will transport large amounts of heat with small temperature gradients independent of gravity effects, which makes these devices suitable for applications in space.

Thermal control systems using heat pipes or thermal switches have been devised to dissipate heat from equipment such as a spacecraft or an airplane. Heat transfer through the heat pipes has been made variable by means of variable conductance heat pipes (a heat pipe containing non-condensable gas with the heat flow modulated by varying the gas-occupied volume of the condenser or evaporator), thermal switch (a device providing a region of variable thermal conductance which is temperature actuated; i.e., with bimetals or expanding fluids) or thermocouple actuators for positioning louvers to cover the radiating surfaces. These systems have been well-developed in the low-temperature, gravity-free environments such as space, but have disadvantages such as degradation due to vibrational loads, wear or limited heat flux control.

Space vehicles have employed heat pipes for a number of years as described in U.S. Pat. Nos. 3,548,930; 4,162,701 and 4,687,048. The primary motivation in this system is a means for moving thermal energy in a system lacking the pull of gravity. A wick is used in the heat pipes to return the working fluid from the condenser to the evaporator. In addition, reservoirs such as shown in U.S. Pat. No. 3,548,930 have been used to store heat for use when the space vehicle is not exposed to sunlight. Generally, prior art heat pipes have been designed to operate in one temperature range with no modulation of the heat transfer rate.

Heretofore, heat pipes have not found broad commercial use because of the constant temperature requirement and inability to modulate the rate of heat transfer.

Heat pipes have recently been integrated with air conditioning equipment to modify the dehumidification capacity of the cooling system. This offers advantages over other dehumidification technologies in that heat pipes are passive, that is, they require no mechanical parts, and do not require an external energy source. In these systems, excess heat is extracted by the heat pipe evaporator from the return air stream prior to passing over the cooling coil. The heat extracted by the evaporator is moved via working fluid through the heat pipe passage to the condenser portion located downstream from the cooling coil. The air, which has been dehumidified and over-cooled upon leaving the cooling coil, is re-heated to a comfortable temperature using the waste heat extracted from the return air. These systems control the heat pipe using a fully "on" or fully "off" scheme. During the fully "off" mode, tilt mechanisms are used to isolate the working fluid in a condensed form using gravity during conditions when the sensible heat capacity is maximized. The heat pipes are "tilted" such that the evaporator is placed in the heat source allowing the working fluid to extract heat, vaporize and travel to the condenser region. The condenser is placed by the tilt mechanism in the heat sink and releases the heat from the working fluid thereby condensing and traveling, via gravity, down the walls of the heat pipe to the evaporator region.

Instead of using a fully on or off scheme, a modulated system for widespread commercial use is needed. A practical heat pipe system employing a modulated system for regulating heat transfer could response to the soaring energy demands in many regions of the world.

SUMMARY OF THE INVENTION

This invention is the discovery of apparatus and methods for modulating and controlling the rate of heat transfer in heat pipe systems so that the system can be used to improve the dehumidification of an air conditioning system and/or to provide an efficient heat exchanger which can operate in varying temperature ranges.

The invention employs a system of sealed heat pipes enclosing a working fluid. In the heating mode the working fluid is evaporated in a hot medium and the latent heat of vaporization is transported through the heat pipes to the condenser region. The condensate returns to the evaporator through a liquid bypass line containing a liquid storage reservoir and a control valve. The control valve either manually or automatically regulates the rate at which the working liquid returns to the evaporator.

In the mode, a cooling mode valve is opened to increase the specific volume of the heat pipe system, lowering system pressure and reducing the fluid saturation temperature. The evaporator is now external to the cooling medium and the heating mode components become inactive. During operation, heat is absorbed from the evaporator region and transferred by the working fluid vapor through the heat pipe system to the cooling medium. The condensate returns to the external evaporator by a liquid return line containing a liquid storage reservoir and a cooling control valve. Electric resistance heating can be incorporated. An electric reservoir heater is turned on and a reservoir cutoff valve is closed. Vapor from the reservoir passes into the heat pipe system through a check valve in a vapor line. Shutdown and system control are regulated by the reservoir cutoff valve and the electric heating.

BRIEF DESCRIPTION OF THE DRAWINGS

The invention may be best understood by those having ordinary skill in the art by reference to the following detailed description when considered in conjunction with the accompanying drawings in which.

DETAILED DESCRIPTION OF THE INVENTION

Figure 1:
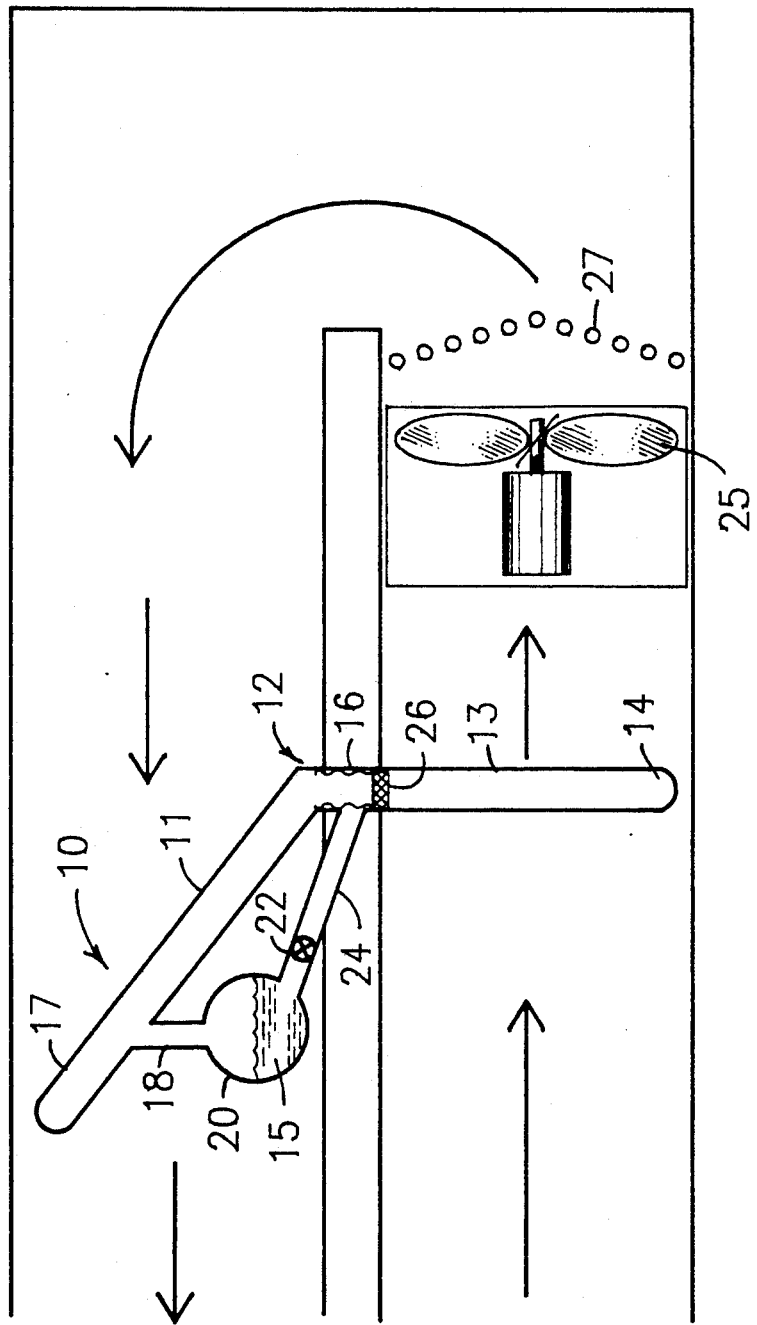
FIG. 1 is a schematic view of a modulated heat pipe system of this invention.

Throughout the following detailed description, the same reference numerals refer to the same elements in all figures.

The heat pipe system 10 of this invention shown in FIG. 1 employs heat pipes 11 and 13 enclosing a working fluid 15. Heat pipe systems typically are in an "on" mode i.e., operating at all times. In this mode, thermal energy is transferred from the heat source to the heat sink via the working fluid in the heat pipe connected to both mediums. During the fully off mode, thermal energy transfer from the hot source to the cold sink ceases. The system described hereafter can operate at part load modes as well as the fully "on" and fully "off" modes. This heat pipe system is modulated by controlling working fluid 15 volume via a flow control device 22 located in a return line 24 adjacent to a reservoir 20 which may store the entire or partial volumes of the heat pipe working fluid 15.

In this system, the operation of the heat pipe is halted by collecting the working fluid in the exterior reservoir 20. Controlled heat pipe operation is achieved by modulating the rate of working fluid 15 addition to the heat pipes 11 and 13 from the reservoir 20 with a control device 22 which could be a control valve. The rate of liquid addition to the system 10 will vary with the opening of the flow control device 22. In the fully on mode, all fluid 15 becomes active in the heat pipe system 10 and the maximum rate of thermal energy transfer is achieved.

Modulation of the heat pipe system volume varies the system pressure providing evaporation at significantly variable temperatures. Thus, one heat pipe system may be modulated to provide a constant heat flux using multiple heat source temperatures or a heat source which degrades with time.

In FIG. 1, fluid control device 22 modulates the working fluid 15 flow rate in the heat pipe system 10. The heat pipe system of this invention shown in FIG. 1 has heat pipes 11 and 13 which extend from the heat sink 17 to the evaporator or heat source 14. The heat pipes can have a number of different geometric configurations. These configurations include cylindrical, spherical, square or any other geometry such that the inner volume of the heat pipe forms a channel from the evaporator portion 14 to the condenser portion 17. The outer surface the heat pipe is designed for optimum heat transfer and may include the use of extended fins (not shown).

The heat pipe system may be constructed from any suitable material, such as, but not limited to, aluminum, stainless steel, or copper. It should be noted that metals used to fabricate the heat pipes 11 and 13 should be compatible with the working fluid 15 as well as with the external media coming in contact with the evaporator 14 and condenser 17.

Although wicking material may be used in this embodiment the heat pipe system is fabricated with a smooth inner surface without grooves or wicks and employs the forces of gravity to maximize fluid return. Wicking material 16 is used only in region 12 to facilitate the path of the vapor to pipe 11 rather than line 24.

If wicking materials are used to maximize the movement of the fluid 15, they should be of uniform porosity, have very small pores interconnected such that the wick can generate a large capillary pressure, be resistant to degradation by temperature, and not react or degrade chemically with the working fluid 15. Typical wicks are disclosed in U.S. Pat. No. 3,964,902, the disclosure of which is herein incorporated by reference. They are easy to fabricate and insert, and they conform to the interior shape of the heat pipe. If micro grooves on the inner surface of the heat pipe are used as a wicking method, they are designed and machined to maximize the capillary forces needed to transfer the fluid.

In moderate to high temperature applications, a conduction limiting device 26 is installed between the condenser region 17 and evaporator region 14. The conduction limiting device 26 may be made of an insulating materials which may be fitted with a connection to join the condenser and evaporator ends. The conduction limiting device 26 minimizes conduction losses during periods when the heat pipe is in the "off" mode. Conduction limiting devices are low thermally conductive, insulating materials which are physically and chemically compatible with heat pipe components and working fluids. These materials can include, but are not limited to, ceramics, rubber or any composite materials.

The working fluid 15 is sealed within the heat pipe system 10. Examples of fluids which may be used include anhydrous ammonia ($NH_3$), and all FREONS, alcohols, and oils. In this embodiment, Freon R-22 or R-12 are preferred since they absorb and release their latent heat of vaporization within the preferred source and sink temperature range of 50° to 80° F.

The evaporator region 14 of the heat pipe system supplies the vapor phase of the fluid 15. The fluid 15 is evaporated at a vapor pressure corresponding to the saturation pressure of the fluid at the instantaneous temperature of the heat pipe. The flow of vapor and liquid is contained within the heat pipe by the closed end of the heat pipe. Heat from the heat source, such as a warm air stream shown by the arrows in FIG. 1 is directly applied to the heat pipe 13 by placing the evaporator region 14 within the heat source. A fan 25 draws the air stream past the evaporator region 14 and pushes the air through a cooling coil 27 to the condenser region 17. The heat will be transferred from the heat source to the working fluid 15 via the walls of the heat pipe portion 13, causing a temperature rise resulting in evaporation of the working fluid 15. The vapor travels past the conduction limiting device 26 along the wicked region 12 and into the condenser region 17 through pipe 11.

The condenser region 17 of the system is at a lower temperature than the vapor phase region 14, causing the fluid to condense and release its latent heat of vaporization to the walls of the condensing region 17. Flow in the condenser region 17 initially consists of high velocity vapor plus a liquid wall film which subsequently turns, as the vapor cools, into slugs of liquid separated by bubbles of vapor. As the vapor condenses, gravity makes it flow down the walls of the heat pipe into line 18 and into the working fluid storage reservoir 20. The slight pressure exerted by the flow of the vapor from the vapor phase flow region 14 causes the vapor to flow to the condenser region 17 and the condensate to flow to the evaporator region 14.

A flow control device 22 such as, but not limited to, a control valve or orifice modulates the flow of liquid 15 down line 24, past the wicked region 12 and the conduction limiting device 26, returning to the evaporator region 14. Because the flow control is protruding from the body of the heat pipe condenser 17 at an angle inconvenient to the flow of the vapor and region 12 is wicked, the vapor will flow only through the condenser channel 11. The condensed liquid is attracted to and encouraged to follow the path through line 18 to the liquid storage reservoir 20 by the angle of the channel from the condenser region 17. In order for the heat pipe device to be completely disabled from heat transfer, the flow control device 22 is placed in a fully closed position wherein all the working fluid 15 is collected as liquid in the liquid storage reservoir 20 and the condensing-evaporating cycle is terminated. When it is desired to resume heat pipe action, the flow control device 22 is opened to allow the liquid to flow into channel 13 to the evaporator region 14 of the heat pipe system. Evaporation of the working fluid 15 is resumed, followed by condensation in the condenser region 17 with return of the liquid through the liquid storage reservoir 20 via the flow control device 22. Flow rate of the working fluid 15 governs the rate of evaporation and the subsequent rate of heat transfer. Thus, the rate of thermal energy exchange can be regulated over a spectrum of conditions from off to fully on.

Figure 2:
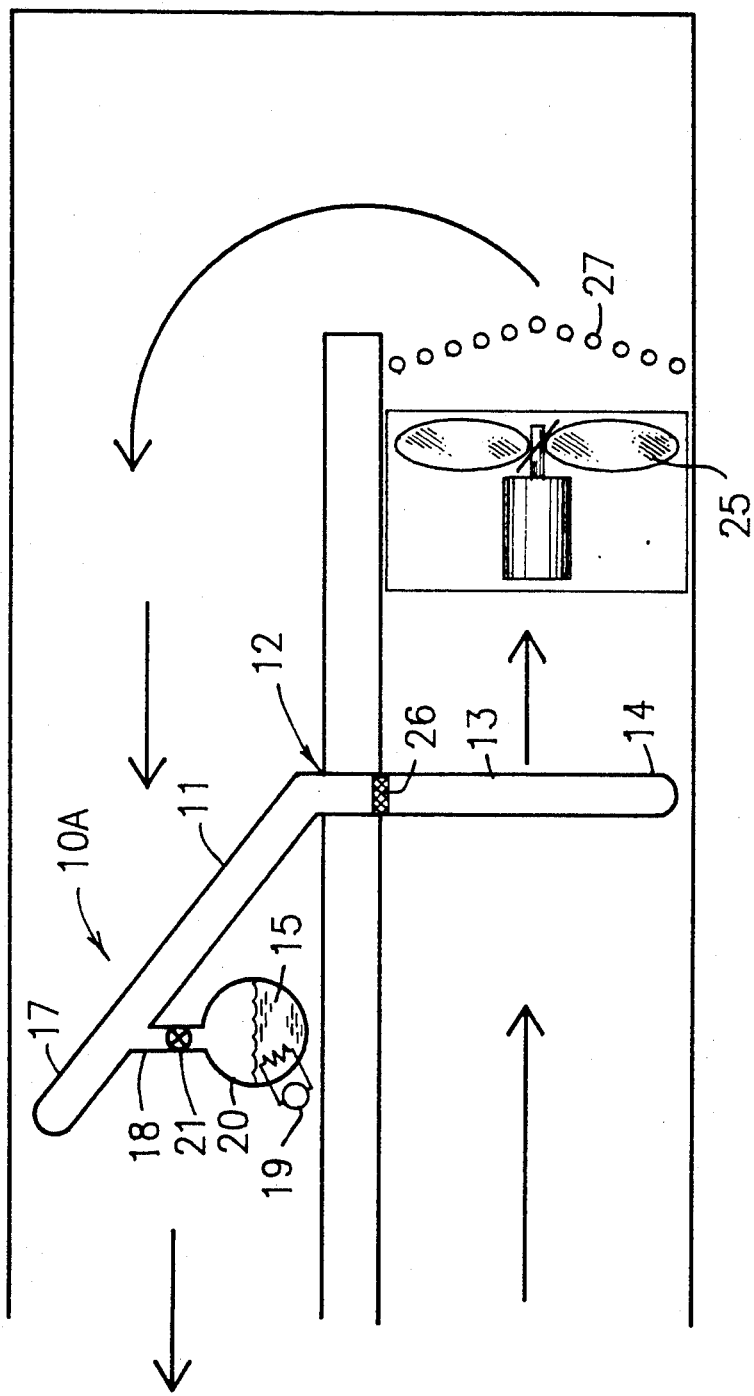
FIG. 2 is a schematic view of an alternate modulated heat pipe system of this invention.

The heat pipe system 10A shown in FIG. 2 is similar to the heat pipe system 10 in FIG. 1 in that the working fluid 15 vaporizes in the evaporation region 14. The vapor passes through conduction limiting device 26 and moves up through the pipes 13 and 11 into the condenser region 17. To cease heat pipe operation, the fluid returning from the condenser 17 is collected and stored in the liquid reservoir 20. Operation is reestablished by heating the liquid working fluid 15 with resistance heater 19 and opening flow control device 21 for a prescribed interval. During this interval, liquid is vaporized and a volume of working fluid 15, determined by the time period during which valve 21 is open, returns to the condenser 17. The vapor passes through the flow device 21 and through line 18 to the condenser region 17. As the vapor condenses, the liquid will follow the heat pipes 11 and 13 to the evaporator region 14.

Figure 3:
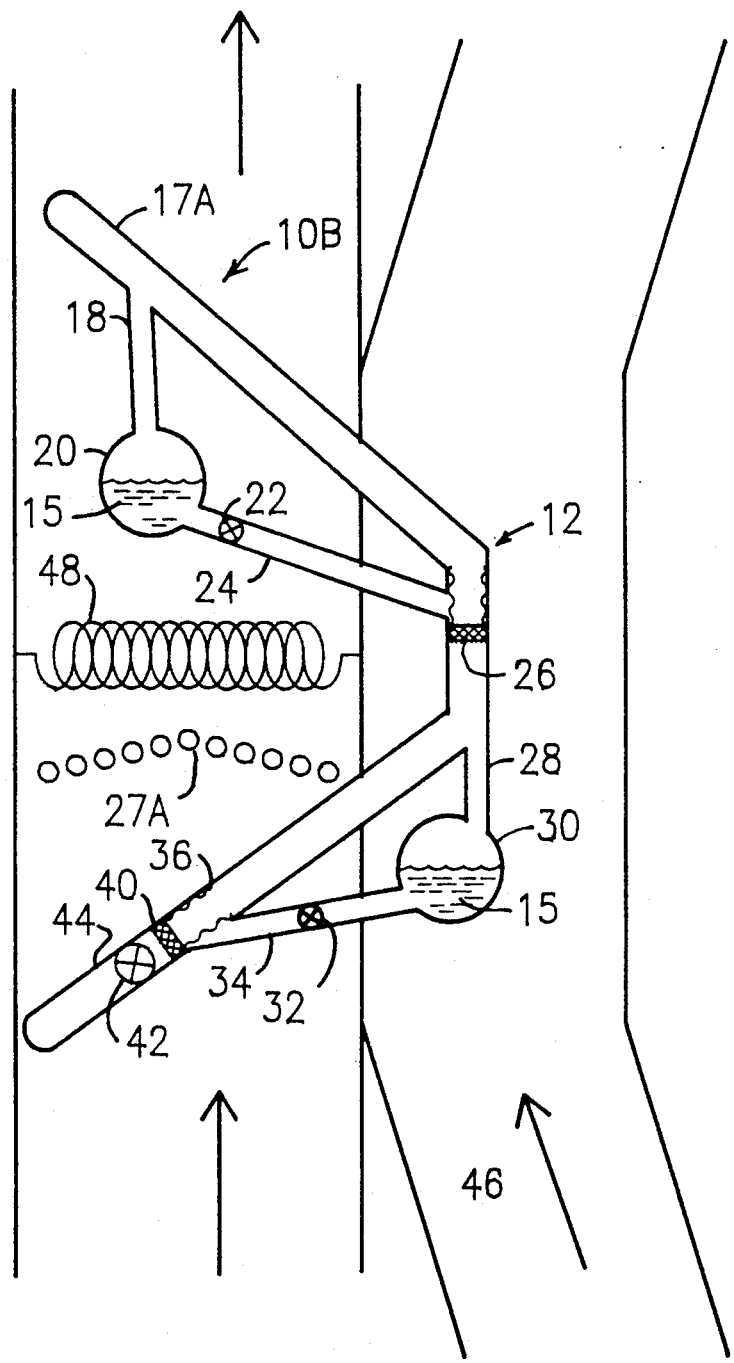
FIG. 3 is a schematic view of a modulated heat pipe system in both the heating and cooling mode.

The heat pipe network 10B in FIG. 3 may be viewed as two independent systems, one for removing heat from a medium, and one for adding heat to that same medium.

When the system is operating in the mode such that heat is removed from region 14A, a staging device 42 is closed preventing the working fluid 15 from entering line 44. In this mode, the heat pipe system operates identical to FIG. 1 previously described. The region 14A is heated causing evaporation of the working fluid 15. The working fluid 15 travels, as a vapor, past the conduction limiting device 26, along the wicked region 12 and into the condenser region 17A. The heat contained in the vapor is extracted causing the working fluid 15 to condense. The condensed liquid follows line 18 into liquid storage reservoir 20, through flow control device 22 in line 24, through the wicked region 12 past the conduction limiting device 26, returning to the evaporator region 14A. When the system is operating in the mode such that heat is being added to region 14A, the staging valve 42 is open, thereby increasing the specific volume of the heat pipe system, lowering the system pressure and significantly reducing the fluid saturation temperature. The evaporator region 14a is now located below the staging valve 42 and heat removal components are inactive. During operation, heat is absorbed from the evaporator region 14a and transferred by the working fluid 15 through the heat pipe system to the condenser region 17a. The condensate returns to the evaporator region 14a via a liquid return line 28 to a liquid storage reservoir 30 through the control device 32 to line 34, past the conduction limiting device 40 and the staging device 42 into the evaporator region 14A. In this embodiment, a wick 36 is used to guide the vapor past line 34 and into the evaporator region 14A. As the heat sink temperatures rise or fall, heat transfer may be held constant by regulating the heat pipe working fluid 15 liquid volume over a spectrum of conditions from fully on to off.

Similarly, the system can be controlled without return line 24 or 34 if electric resistance heating is applied to the reservoir 30 as illustrated in FIG. 2.

Heat pipes used in the described system of FIG. 1 in a typical design has thirty-two, one inch outer diameter copper tubes, each forty-two inches in length with about eleven integral aluminum fins per inch of copper tube. The pressure drop across the evaporator or condenser is less than 0.3 inches of water, The evaporator region 14 is inclined from the condenser region 17 at an angle of about twenty degrees. The supply fan 25 provides 1750 cfm and the duct size is 19 inches by 23 inches. A fourteen degree drop across the heat pipes with FREON ® R22 as the working fluid yields approximately 26,000 BTU per hour of heat recovery.

In the system shown in FIG. 3, either waste heating or waste cooling energy may be recovered. When waste heating is used, air enters at the bottom 46 at about 68° F. The air passes over the inactive Region 14A, then over Region 17A and then over the resistance heater 48. The air leaves the system at 100°-150° F.

When waste cooling energy is used, air enters the system at 75° F. and passes over cooling coil 27A and leave the system at 55° F. In either case, the heat transfer may be maintained at 25,000 BTU by modulating the amount of working fluid in the system. If the source air is below approximately 68° F. for the heating mode or above approximately 75° F. for the cooling mode, the control valves are opened sufficiently to permit transfer of the required heat. As the source temperature changes, the control valve opens or closes to meet the heat transfer design requirements.

While there have been described and illustrated several specific embodiments of the invention, it will be clear that variations in the details of the embodiments specifically illustrated and described may be made without departing from the true spirit and scope of this invention as described in the appended claims.

Having thus described the invention, what is claimed and desired to be secured by Letters Patent is:

1. In a controllable heat pipe system with a condenser region and an evaporator region at opposite ends and a working fluid sealed within the system, the improvement comprising, a first channel within the heat pipe system leading from the evaporator region and being at about a twenty degree angle from a contiguous second channel within the heat pipe system leading from the first channel to the condenser region, a third channel within the heat pipe system leading from the condenser region to a reservoir spaced apart from the condenser and evaporator regions, the reservoir used for storing the working fluid, a fourth channel connecting the reservoir to the first channel, and a flow control device located in at least one channel between the reservoir and either the condenser region or the evaporator region.

2. An improved heat pipe system according to claim 1 wherein a conduction limiting device is located in the first channel adjacent an entrance of the fourth channel into the first channel.

3. An improved heat pipe system according to claim 2 wherein a wick is located in the first channel above the conduction limiting device.

4. An improved heat pipe system according to claim 1 wherein the reservoir is heated by electric resistance heating to vaporize the working fluid stored in the reservoir, the flow control device being located in the third channel to control the flow of working liquid from the condenser region to the reservoir, the vaporized working fluid in the reservoir flowing to the condenser region from the heated reservoir.

5. An improved heat pipe system according to claim 4 wherein a conduction limiting device is located in the first channel.

* * * * *